United States Patent
Lee

(10) Patent No.: US 10,474,259 B2
(45) Date of Patent: Nov. 12, 2019

(54) METHOD OF CONTROLLING DEVICE USING VARIOUS INPUT TYPES AND DEVICE FOR PERFORMING THE METHOD

(71) Applicant: Samsung Electronics Co., Ltd., Gyeonggi-do (KR)

(72) Inventor: Kang-min Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 395 days.

(21) Appl. No.: 14/942,355

(22) Filed: Nov. 16, 2015

(65) Prior Publication Data

US 2016/0139697 A1    May 19, 2016

(30) Foreign Application Priority Data

Nov. 14, 2014  (KR) .......................... 10-2014-0158908

(51) Int. Cl.
| | | |
|---|---|---|
| *G06F 3/041* | (2006.01) | |
| *G06F 3/01* | (2006.01) | |
| *G06F 3/14* | (2006.01) | |
| *G06F 3/0488* | (2013.01) | |
| *G06F 3/0354* | (2013.01) | |

(52) U.S. Cl.
CPC .............. *G06F 3/041* (2013.01); *G06F 3/017* (2013.01); *G06F 3/03545* (2013.01); *G06F 3/0416* (2013.01); *G06F 3/0488* (2013.01); *G06F 3/14* (2013.01); *G06F 2203/04101* (2013.01); *G06F 2203/04106* (2013.01); *G06F 2203/04108* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 2006/0010400 A1* | 1/2006 | Dehlin | G06F 3/0354 715/856 |
| 2011/0115742 A1* | 5/2011 | Sobel | G06F 21/32 345/174 |
| 2011/0119216 A1* | 5/2011 | Wigdor | G06F 3/017 706/46 |
| 2012/0050180 A1* | 3/2012 | King | G06F 3/0416 345/173 |
| 2012/0050211 A1* | 3/2012 | King | G06F 3/0416 345/174 |
| 2012/0054670 A1* | 3/2012 | Rainisto | G06F 3/0485 715/784 |

(Continued)

FOREIGN PATENT DOCUMENTS

WO    WO 2013/135972    9/2013

OTHER PUBLICATIONS

International Search Report dated May 11, 2016 issued in counterpart application No. PCT/KR2015/011611, 12 pages.

*Primary Examiner* — David D Davis
(74) *Attorney, Agent, or Firm* — The Farrell Law Firm, P.C.

(57) ABSTRACT

A method of controlling a device is provided. The method includes receiving a touch input and a hovering input, determining an operation corresponding to input pattern information generated according to the received touch input and the received hovering input, from among operations of an application running on the device, and performing the determined operation.

17 Claims, 25 Drawing Sheets

(56) References Cited

U.S. PATENT DOCUMENTS

| | | | |
|---|---|---|---|
| 2012/0068941 A1* | 3/2012 | Arrasvuori | G06F 3/04883 |
| | | | 345/173 |
| 2012/0102436 A1* | 4/2012 | Nurmi | G06F 1/1613 |
| | | | 715/863 |
| 2012/0169624 A1* | 7/2012 | Garn | G06F 3/04883 |
| | | | 345/173 |
| 2012/0188183 A1* | 7/2012 | Heo | G06F 3/0416 |
| | | | 345/173 |
| 2012/0262407 A1 | 10/2012 | Hinckley et al. | |
| 2013/0050131 A1* | 2/2013 | Lee | G08G 1/09626 |
| | | | 345/174 |
| 2013/0232446 A1 | 9/2013 | Lin | |
| 2013/0241827 A1* | 9/2013 | Ronkainen | G06F 3/0488 |
| | | | 345/157 |
| 2014/0009430 A1 | 1/2014 | Italia et al. | |
| 2014/0055399 A1* | 2/2014 | Lee | G06F 3/03 |
| | | | 345/173 |
| 2014/0118267 A1* | 5/2014 | Thomas | G06F 21/31 |
| | | | 345/173 |
| 2014/0198069 A1 | 7/2014 | Park et al. | |
| 2014/0210787 A1 | 7/2014 | King-Smith et al. | |
| 2014/0240255 A1* | 8/2014 | Kim | G06F 3/0488 |
| | | | 345/173 |
| 2014/0240260 A1* | 8/2014 | Park | G06F 3/0488 |
| | | | 345/173 |
| 2014/0245229 A1* | 8/2014 | Jeon | G06F 3/0488 |
| | | | 715/846 |
| 2014/0282279 A1* | 9/2014 | Woolley | G06F 3/04883 |
| | | | 715/863 |
| 2015/0338964 A1* | 11/2015 | King | G06F 3/0416 |
| | | | 345/174 |
| 2016/0034041 A1* | 2/2016 | Shin | G06F 1/163 |
| | | | 345/156 |

\* cited by examiner

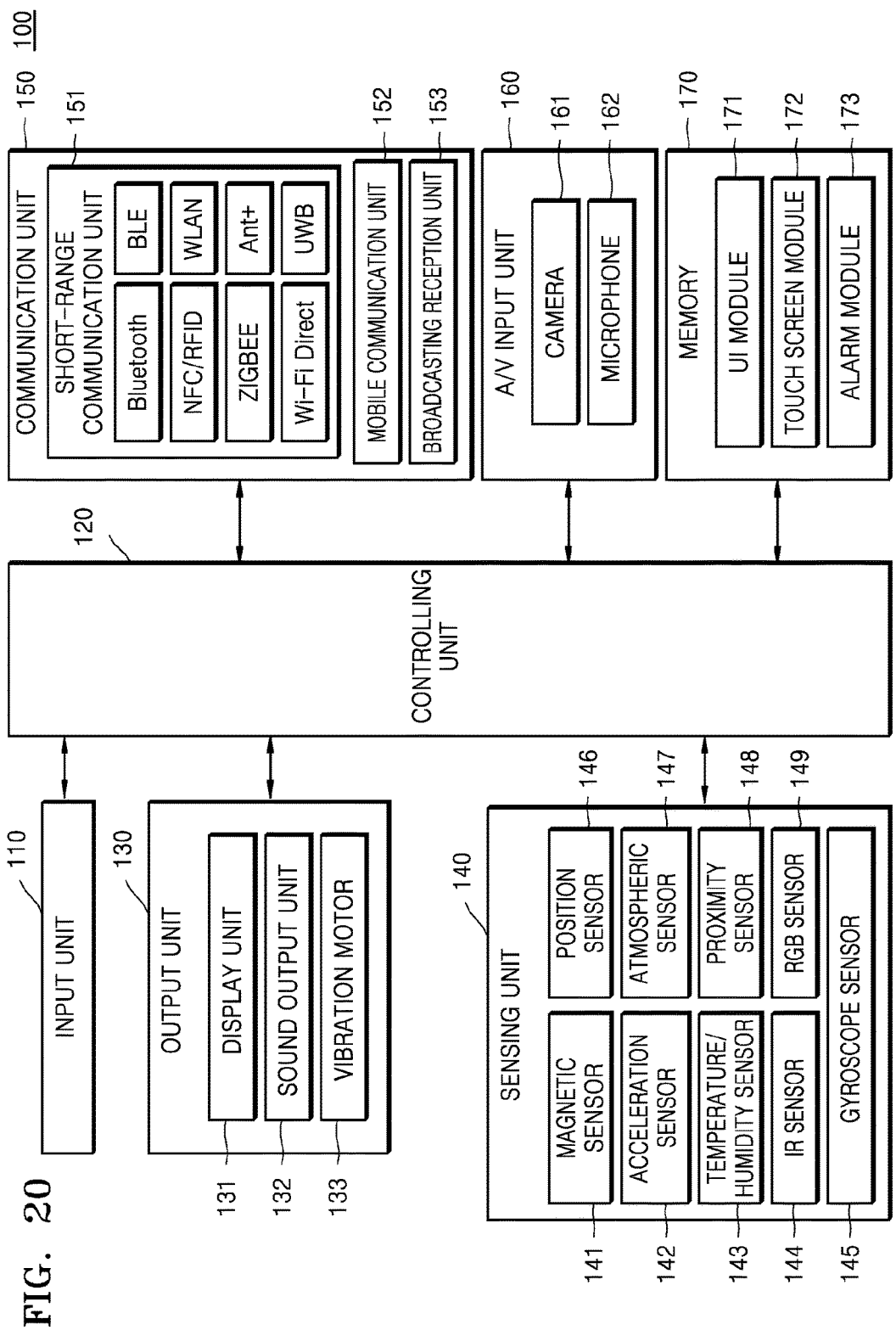

METHOD OF CONTROLLING DEVICE USING VARIOUS INPUT TYPES AND DEVICE FOR PERFORMING THE METHOD

PRIORITY

This application claims priority under 35 U.S.C. § 119 to Korean Patent Application No. 10-2014-0158908, filed on Nov. 14, 2014, in the Korean Intellectual Property Office, the entire disclosure of which is incorporated herein by reference.

BACKGROUND

1. Field of Invention

The present disclosure relates generally to a device and a method for controlling a device.

2. Description of the Related Art

With the development of network and multimedia technologies, a user of a device may receive various services from a service providing server. In addition, such devices may provide various types of user interfaces to users.

According to the various types of services and user interfaces, there may be various types of user inputs available when a user controls the device to receive a desired service. Recently, due to the various types of sensors included in a device, a technique of controlling a device, by sensing various types of inputs through the sensors is needed as an efficient way to provide an input to the various services.

SUMMARY

The present invention has been made to address at least the problems and disadvantages described above, and to provide at least the advantages described below.

Accordingly, an aspect of the present invention is to provide a method of controlling a device, whereby a plurality of different types of user inputs may be provided to determine an operation of the device.

In accordance with an aspect of the present invention, a method of controlling a device is provided. The method includes receiving, by the device, a touch input and a hovering input, determining an operation corresponding to input pattern information generated according to the received touch input and the received hovering input, from among operations of an application running on the device, and performing the determined operation.

In accordance with another aspect of the present invention, a device is provided. The device includes a user input unit configured to receive a touch input and a hovering input, a control unit configured to determine an operation corresponding to input pattern information generated according to the received touch input and the received hovering input, from among operations of an application being executed in the device, and an output unit configured to perform the determined operation.

BRIEF DESCRIPTION OF THE DRAWINGS

These above and other aspects, features, and advantages of the present invention will become apparent from the following description, taken in conjunction with the accompanying drawings, in which:

FIGS. 19 and 20 are block diagrams of configurations of a device, according to an embodiment of the present invention.

DETAILED DESCRIPTION OF EMBODIMENTS OF THE PRESENT INVENTION

Figure 1:
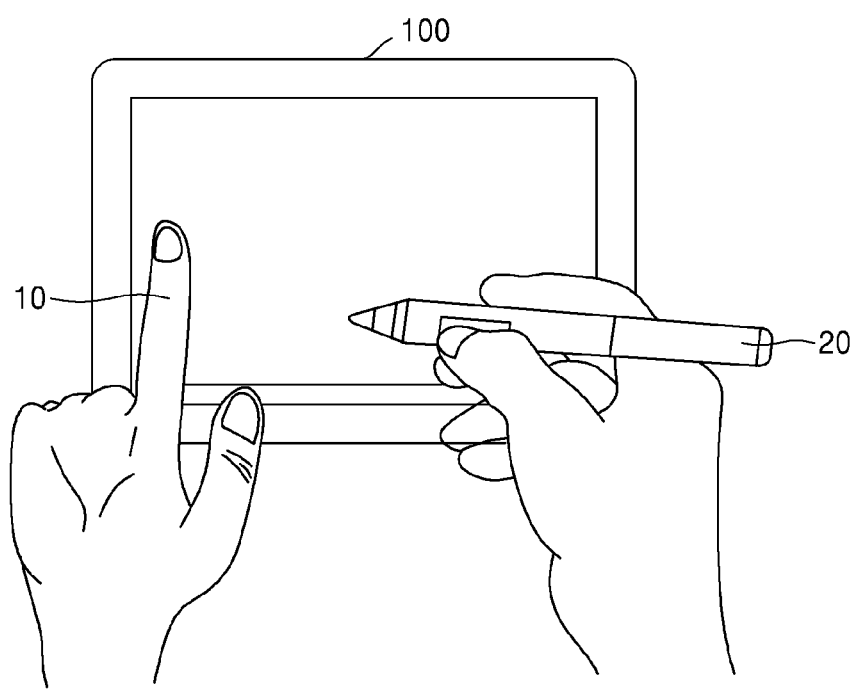
FIG. 1 illustrates a method of controlling a device, according to an embodiment of the present invention.

The following description, made with reference to the accompanying drawings wherein like reference numerals refer to like elements, is provided to assist in a comprehensive understanding of various embodiments of the present invention as defined by the claims and their equivalents. The description includes various specific details to assist in that understanding, but these are to be regarded as merely illustrative. Accordingly, those of ordinary skill in the art will recognize that various changes and modifications of the various embodiments described herein can be made without departing from the scope and spirit of the present invention. In addition, descriptions of well-known functions and constructions may be omitted for clarity and conciseness.

Accordingly, the terms and words used in the following description and claims are not limited to their dictionary meanings, but are used to enable a clear and consistent understanding of the present invention. Therefore, it should be apparent to those skilled in the art to which the present invention pertains that the following description of various embodiments of the present invention is provided for illustration purposes only, and not for the purpose of limiting the present invention as defined by the appended claims and their equivalents.

In the present disclosure, the term "application" refers to a series of computer program codes for performing a specific task. Various applications may be described in the disclosure. For example, the applications may include a game application, a video play application, a map application, a memo application, a calendar application, a phonebook application, a broadcast application, an exercise support application, a payment application, a photograph folder application, etc., but are not limited thereto.

In the present disclosure, when a certain part "includes" a certain component, this indicates that the part may further include another component. In addition, terms, such as "unit" or "module," disclosed herein refer to a unit for processing at least one function or operation, and this may be implemented by hardware, software, or a combination thereof.

In the present disclosure, the term "and/or" includes any and all combinations of one or more of the associated listed items. Expressions such as "at least one of," when preceding a list of elements, modify the entire list of elements and do not modify the individual elements of the list.

In the present disclosure, the term "touch input" refers to a gesture performed by a user on a touch screen to control a device. For example, types of a touch input described in the specification may be a tap, a touch and hold, a double tap, a drag, a panning, a flick, a drag and drop, etc.

The term "tap" refers to a gesture in which a user touches a screen by using a finger or a touch tool (e.g., an electronic pen or a stylus) and then immediately lifts the finger or the touch tool from the screen without first moving the finger or the touch tool.

The term "touch and hold" refers to a gesture in which a user touches a screen by using a finger or a touch tool and then maintains the touch input for a critical time (e.g., two seconds) or more. For example, a time difference between a touch-in time point and a touch-out time point is the critical time or more. In order for the user to recognize whether a touch input is a tap or a touch and hold, when the touch input is maintained for the critical time or more, an auditory or tactile feedback signal may be provided. The critical time may vary according to implementation.

The term "double tap" refers to a gesture in which a user touches a screen twice by using a finger or a touch tool.

The term "drag" refers to a gesture in which a user touches a screen by using a finger or a touch tool and then moves the finger or the touch tool to another location on the screen while maintaining the touch. Due to a drag action, an object may move, or a panning operation to be described below may be performed.

The term "panning" refers to a gesture in which a user performs a drag gesture without first selecting an object. Since a specific object is not selected by a panning, no object moves in a page, instead the page moves on a screen, or an object group moves in the page.

The term "flick" refers to a drag gesture performed at a critical speed (e.g., 100 pixels) or more, by a user using a finger or a touch tool. A drag (or panning) and a flick may be differentiated from each other based on whether a moving speed of the finger or the touch tool is the critical speed (e.g., 100 pixels/s) or more.

The term "drag and drop" refers to a gesture in which a user drags an object to a predetermined location on a screen and drops the object at the predetermined location by using a finger or a touch tool.

The term "pinch" refers to a gesture in which a user moves two fingers in different directions while touching a screen with the two fingers. A pinch is a gesture for magnification (pinch open) or contraction (pinch close) of an object or a page, wherein a magnification value or a contraction value are determined according to a distance between the two fingers.

The term "swipe" refers to a gesture for moving an object by a predetermined distance in a horizontal or vertical direction while touching the object on a screen by using a finger or a touch tool. A motion in a diagonal direction may not be recognized as a swipe event.

The term "hovering input" refers to an input signal for changing an electrical signal generated by a device when a user places a hovering input device or finger within a preset range of the device without contacting the device. A type of the hovering input may be determined based on at least one of a location and a time when the hovering input is input and a type and a motion of the hovering input device.

For example, a hovering input type may be determined based on a height where a hovering input is sensed. When a first hovering input is sensed at a location of a first height from a screen of the device, and a second hovering input is sensed at a location of a second height that is higher than the first height, the device may determine the first hovering input and the second hovering input as different hovering input types.

As another example, a hovering input type may be determined based on a time length for which a hovering input is sensed. The device may determine, as different hovering input types, a hovering input received for a first unit time and a hovering input received for a second unit time that is longer than the first unit time.

As another example, a hovering input type may be determined based on a motion of a hovering input. A hovering input moving in a first direction and a hovering input moving in a second direction may be determined as different hovering input types.

As another example, a hovering input type may be determined based on speed of a hovering input. A hovering input moving at a first speed and a hovering input moving at a second speed may be determined as different hovering input types.

As another example, a hovering input type may be determined based on a material of a hovering input device. A hovering input generated by an input means of a first material and a hovering input generated by an input means of a second material may be determined as different hovering input types.

FIG. 1 illustrates a method of controlling a device, according to an embodiment of the present invention.

Referring to FIG. 1, a device 100 is provided. The device 100 receives at least one user input. In addition, when a plurality of user inputs are received, the device 100 generates input pattern information by combining the plurality of received user inputs. The input pattern information may vary according to characteristic of each of the plurality of user inputs received by the device 100 and a combination of the plurality of user inputs received by the device 100.

Hereinafter, for convenience of description, a method of controlling the device 100, according to an embodiment of the present invention, will be described under the assumption that a touch input 10 and a hovering input 20 are received from among the plurality of user inputs.

The input pattern information is determined based on at least one of a type of the touch input 10 received by the device 100, a type of the hovering input 20 received by the device 100, an input order and a number of inputs of the received touch input 10, and an input order and a number of inputs of the received hovering input 20.

Additionally, when the touch input 10 is received, the device 100 determines a type of the touch input 10 based on at least one of a location and a time of the received touch input 10, and a motion and a type of a touch input means for generating the touch input 10. Herein, the touch input means may include a finger and a tool capable of changing an electrical signal generated by the device 100, by touching the device 100.

In addition, when the hovering input 20 is received, the device 100 determines a type of the hovering input 20 based on at least one of a location and a time of the received hovering input 20 and a type and a motion of a hovering input means for generating the hovering input 20. Herein, the hovering input means may include a tool capable of changing an electrical signal generated by the device 100 in a contactless state with the device 100.

When types of the received touch input 10 and hovering input 20 are determined, the device 100 generates input pattern information by combining the touch input 10 and the hovering input 20 based on at least one of an input order of the touch input 10 and the hovering input 20 and a number of times the touch input 10 and the hovering input 20 are input. The input pattern information may vary according to at least one of types of a plurality of touch inputs 10 and hovering inputs 20, an input order of the plurality of touch inputs 10 and hovering inputs 20, and numbers of times the plurality of touch inputs 10 and hovering inputs 20 are input. For example, input pattern information generated when the touch input 10 and the hovering input 20 are simultaneously input, and input pattern information generated when the touch input 10 and the hovering input 20 are consecutively inputted within a time interval, may differ from each other. In addition, when the touch input 10 and the hovering input 20 are sequentially inputted, input pattern information may vary according to an input order. As another example, input pattern information may vary according to the number of input times of each of the touch input 10 and the hovering input 20.

Input pattern information generated as a result of combining the touch input 10 and the hovering input 20 will be described below in more detail with reference to FIG. 2.

The device 100 may detect metadata related to a running application from a pre-stored database to perform an operation corresponding to generated input pattern information based on the application. For example, the metadata related to the application may include information on a second operation corresponding to the input pattern information, from among a plurality of second operations related to a first operation, when the input pattern information is generated during the first operation. The device 100 may determine an operation corresponding to the generated input pattern information from the detected metadata related to the application.

The device 100 may identify a type of user input based on characteristics of a received user input.

According to an embodiment of the present invention, the device 100 may be implemented in various forms. For example, the device 100 may be a cellular phone, a smartphone, a laptop computer, a tablet personal computer (PC), an e-book terminal, a digital broadcast terminal, a personal digital assistant (PDA), a portable multimedia player (PMP), a navigation, an MP3 player, a digital camera, etc., but is not limited thereto.

Figure 2:
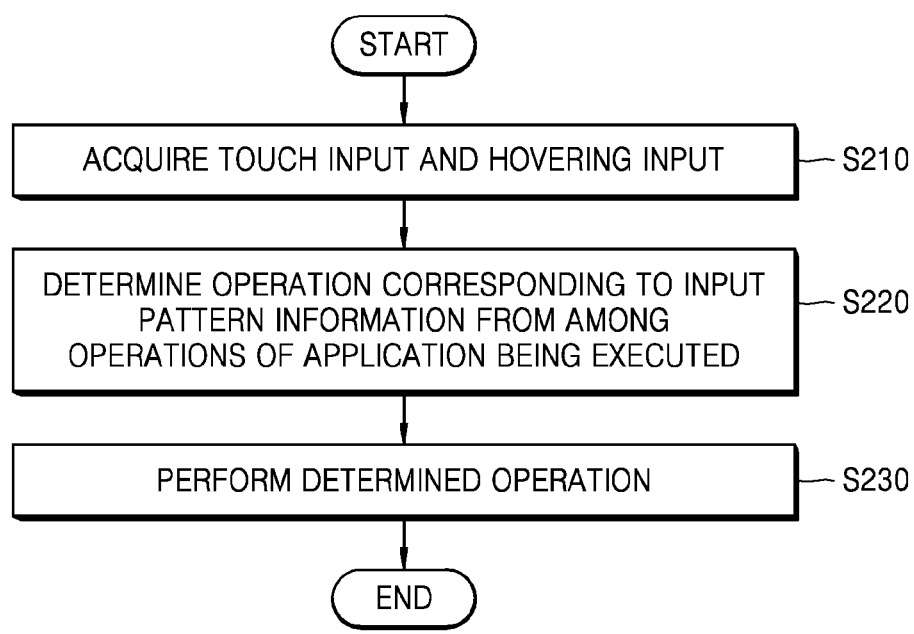
FIG. 2 is a flowchart of the method of controlling a device, according to an embodiment of the present invention.

FIG. 2 is a flowchart of the method of controlling a device, according to an embodiment of the present invention.

Referring to FIG. 2, in step S210, the device 100 receives the touch input 10 and the hovering input 20. The device 100 receives the touch input 10 and the hovering input 20 through a user interface provided by the device 100.

For example, the device 100 may provide a common user interface for a plurality of user inputs so that the touch input 10 and the hovering input 20 is transmitted to the device to perform a desired operation.

As another example, the device 100 may provide separate user interfaces for the touch input 10 and the hovering input 20, respectively. In this case, the device 100 may provide a first user interface on a first side of a screen, through which the touch input 10 is transmitted, and a second user interface on a second side of the screen, through which the hovering input 20 is transmitted. The user may request the device to perform a desired operation by using the first user interface and the second user interface, respectively, to transmit the touch input 10 and the hovering input 20.

In step S220, the device 100 determines an operation corresponding to input pattern information generated by combining the received touch input 10 and the received hovering input 20, from among operations of a running application.

In this case, the device 100 determines a type of each of the received touch input 10 and the received hovering input 20. In addition, the device 100 identifies at least one of an input order of the received touch input 10 and the received hovering input 20 and a number of times the received touch input 10 and the received hovering input 20 are input. The device 100 generates the input pattern information based on at least one of the types of the received touch input 10 and the received hovering input 20, the input order of the received touch input 10 and the received hovering input 20, and the number of times the received touch input 10 and the received hovering input 20 are input.

The device 100 may detect information on the operation corresponding to the input pattern information from among a plurality of operations to be performed by the application, from metadata related to the application. When the touch input 10 and the hovering input 20 are received, the device 100 may receive the metadata related to the application running on the device 100.

The metadata related to the application may include input pattern information corresponding to each of the plurality of operations to be performed by the application. For example, for a video application, input pattern information generated when the touch input 10 and the hovering input 20 are simultaneously received may correspond to an operation of playing a video.

The device 100 determines an operation corresponding to the generated input pattern information by comparing input pattern information preset according to the application running with the generated input pattern information.

The device 100 determines an operation corresponding to input pattern information according to content provided by the running application. Herein the content may include multimedia content (e.g., video, music, etc.), a webpage being displayed on a memo application screen, a photograph, a picture, a message, a calendar, schedule information, folder information, an execution window of the running application, etc., but is not limited thereto. For example, an operation determined by the device 100 according to first input pattern information may vary for a case where a video is being played or a case where music is being played. When a video is being played, if the first input pattern information is generated, the device 100 may capture a scene being currently played. Alternatively, when music is being played, if the first input pattern information is generated, the device 100 may repeatedly play music up to a section being currently played.

In step S230, the device 100 performs the determined operation. The device 100 may change content to be output from the device 100, according to the determined operation.

For example, when a messenger application or a memo application is running on the device 100, the device 100 may change a format of a keypad by which a text is input, according to input pattern information. This will be described below in detail with reference to FIG. 11.

As another example, when a game application is running on the device 100, the device 100 may replace various operation keys used in a game with combinations of the touch input 10 and the hovering input 20. The device 100 may intuitively perform an operation desired to be performed in the game through a combination of the touch input 10 and the hovering input 20. For example, when the user desires to control a character in the game application to jump, the user may perform a jump operation by adjusting an input height of the hovering input 20 in a state of inputting the touch input 10.

As another example, for an application for which security reinforcement is needed, the device 100 may reinforce security related to the application by setting pattern information for unlocking based on a combination of the touch input 10 and the hovering input 20. This will be described below in detail with reference to FIG. 12.

As another example, when a gallery application is running on the device 100, the device 100 may control photographs, video, etc. being displayed, according to generated input pattern information. For example, when the touch input 10 is sensed on the screen on which the gallery application is running and then the hovering input 20 is sensed within a preset time, the device 100 may move a list of photographs being displayed, in a direction of the hovering input 20. Alternatively, when a video is being displayed on the screen, if the touch input 10 and the hovering input 20 are simultaneously received and then the hovering input 20 moves in a specific direction, the device 100 may change a frame of the video to be played, according to the moving direction of the hovering input 20.

As another example, when at least one application execution window is displayed on the screen, the device 100 may change a size of the execution window according to generated input pattern information. Alternatively, when a plurality of application execution windows are displayed on the screen, the device 100 may change a type of an execution window to be displayed in an upper layer on the screen, according to generated input pattern information.

Figure 3:
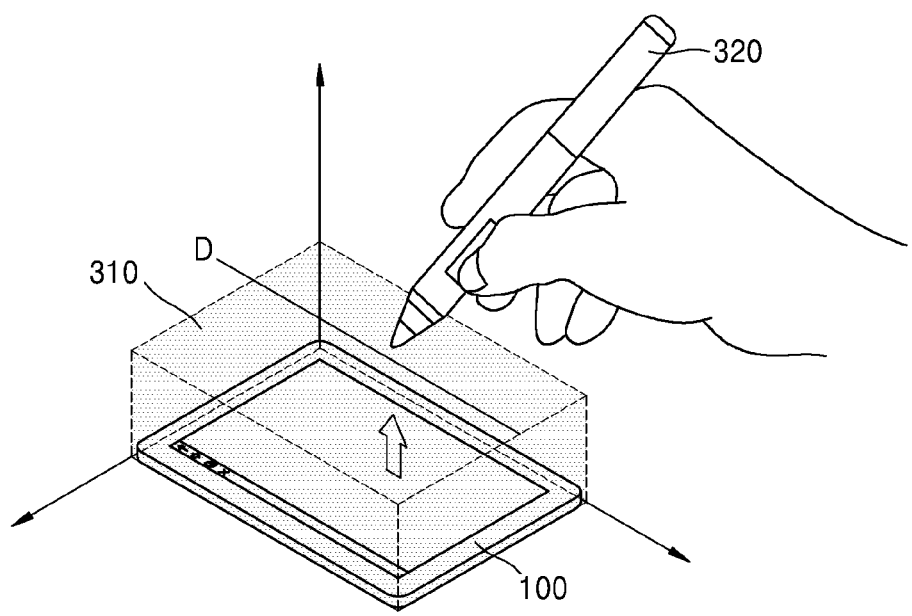
FIG. 3 illustrates a type of a hovering input received by a device, according to an embodiment of the present invention.

FIG. 3 illustrates a type of a hovering input received by a device, according to an embodiment of the present invention.

Referring to FIG. 3, a type of a hovering input 320 received by the device 100 is illustrated. The device 100 may preset an input area 310 from which the hovering input 320 is receivable. For example, the device 100 may set, as the input area 310, an area within a preset range from a sensor capable of sensing a change in a capacitance in the device 100 according to the hovering input 320.

The device 100 may, additionally, identify a type of the hovering input 320 according to a height of the hovering input 320 received within the input area 310. This will be described below in detail with reference to FIG. 7.

Figure 7:
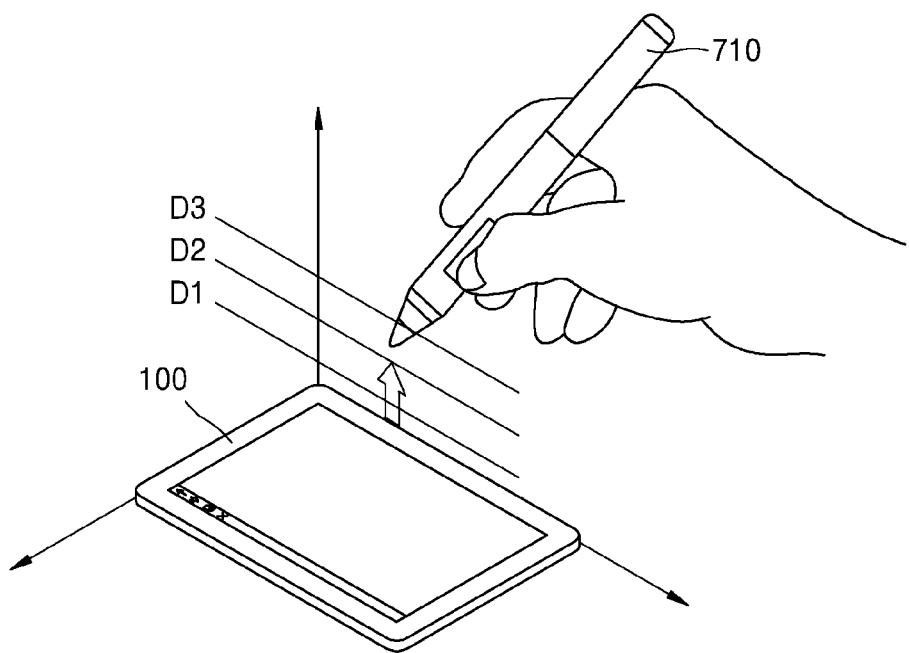
FIG. 7 illustrates a method used by a device to identify a hovering input, received in an input area, on the basis of height, according to an embodiment of the present invention.

FIG. 7 illustrates a method used by a device to identify a hovering input, received in an input area, on the basis of height, according to an embodiment of the present invention.

Referring to FIG. 7, when hovering inputs 710 are received at heights D1, D2, and D3, in an input area 310 of the device 100, the device 100 may determine that the hovering inputs 710 at the heights D1, D2, and D3 differ from each other. The hovering inputs 710 received at different heights may cause different input pattern information to be generated with the touch input 10 received within a preset time range.

For example, when a video play application is running on the device 100, the device 100 may receive the touch input 10 on the first side of the screen and receive a first hovering input at the height D1 on the second side. The device 100 generates first input pattern information based on the received touch input 10 and the first hovering input. The device 100 may perform a play operation corresponding to the generated first input pattern information.

Alternatively, the device 100 may receive the touch input 10 on the first side of the screen and receive a second hovering input at the height D2 on the second side. The device 100 generates second input pattern information based on the received touch input 10 and the second hovering input. The device 100 may perform a two times fast forward operation corresponding to the generated second input pattern information.

Alternatively, the device 100 may receive the touch input 10 on the first side of the screen and receive a third hovering input at the height D3 on the second side. The device 100 generates third input pattern information based on the received touch input 10 and the third hovering input. The device 100 may perform a three times fast forward operation corresponding to the generated third input pattern information.

Referring back to FIG. 3, the device 100 may also identify a type of the hovering input 320 according to a time length of the hovering input 320 received within the input area 310. In addition, the device 100 may set a critical time for recognizing a valid hovering input so that the device 100 identifies an undesired hovering input. For example, if a time length of a received hovering input is less than two seconds, the device 100 may determine that the received hovering input is not valid.

Alternatively or additionally, the device 100 may identify the hovering input 320 according to a motion of the hovering input 320 received within the input area 310. For example, the device 100 may identify a clockwise rotating hovering input and a counterclockwise rotating hovering input according to a direction of the hovering input 320 received within the input area 310.

Alternatively or additionally, the device 100 may identify the hovering input 320 according to a speed of the hovering input 320 received within the input area 310.

Alternatively or additionally, the device 100 may identify the hovering input 320 according to a gradient direction of the hovering input 320 received within the input area 310.

Figure 4:
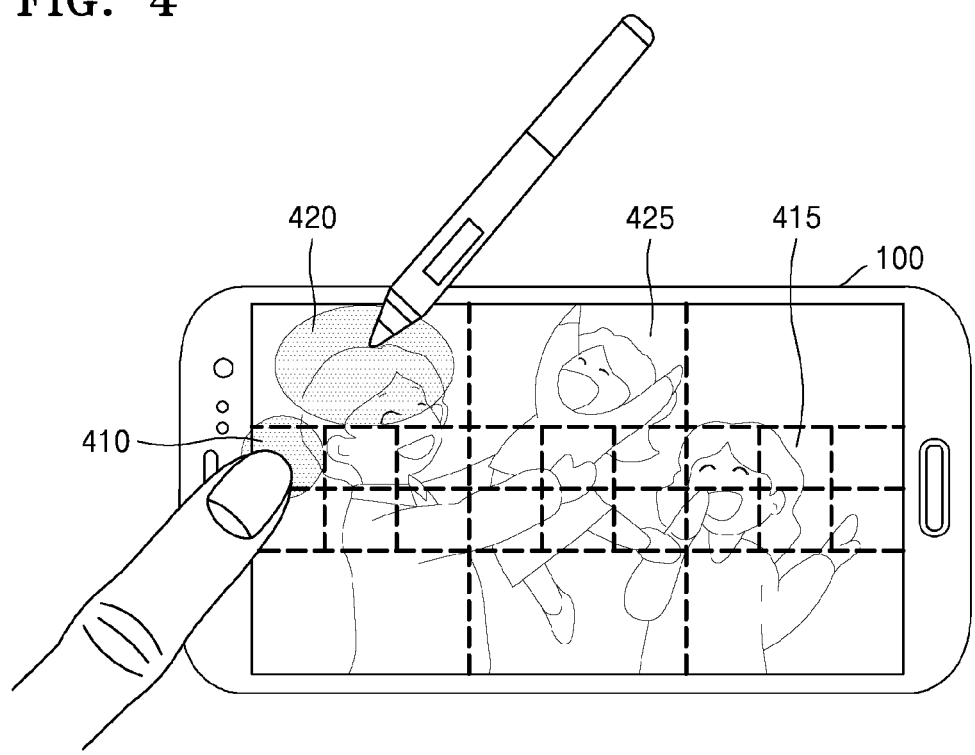
FIG. 4 illustrates respective sensing areas for identifying a touch input and for identifying a hovering input received by a device, according to an embodiment of the present invention.

FIG. 4 illustrates respective sensing areas for identifying a touch input and for identifying a hovering input received by a device, according to an embodiment of the present invention.

Referring to FIG. 4, the device 100 may set various units of blocks to form sensing areas (hereinafter, "block unit") for identifying a user input according to a type of a received user input. Herein, the block unit for identifying a user input refers to an area corresponding to a single user input received through a user interface provided on the screen.

The device 100 may determine that user inputs within a single block unit are all the same type of input.

For example, the user may input a touch input 410 by touching a key button included in a first sensing area displayed on the screen to sense the touch input 410. For example, the device 100 may determine that all the touch inputs 410 inputted within a range of a first block unit 415, including a key button, are touch inputs corresponding to the key button.

As another example, the user may input a hovering input 420 on an icon included in a second sensing area displayed on the screen to sense the hovering input 420. For example, the device 100 may determine that all the hovering inputs 420 inputted within a range of a second block unit 425, including an icon located on first coordinates of the second sensing area, are hovering inputs corresponding to the icon.

Accordingly, the device 100 may differently set the first block unit 415 for identifying the touch input 410 and the second block unit 425 for identifying the hovering input 420. Since the touch input 410 is in direct contact with the screen of the device 100, the touch input 410 may have a smaller input error range than the hovering input 420. Therefore, a size of blocks for identifying a first touch input and a second touch input may be smaller than a size of a block for the hovering input 420.

Figure 5:
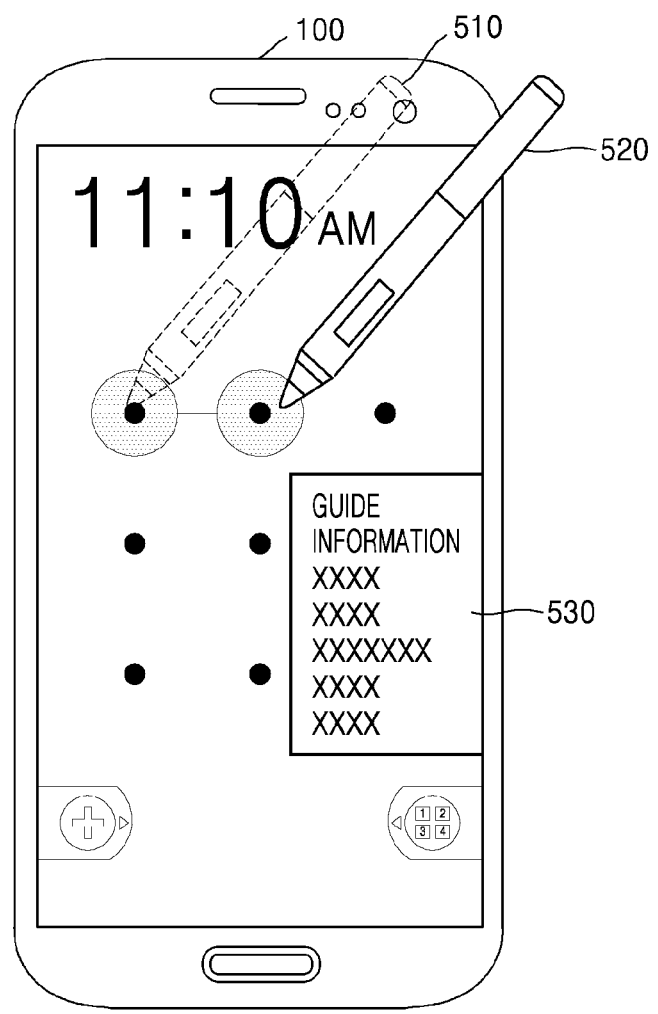
FIG. 5 illustrates a method used by a device to provide guide information to a user for generating input pattern information, according to an embodiment of the present invention.

FIG. 5 illustrates a method used by a device to provide guide information to a user for generating input pattern information, according to an embodiment of the present invention.

Referring to FIG. 5, the device 100 provides guide information 530 for generating specific input pattern information, based on a running application and a previously received user input. According to an embodiment of the present invention, when a first hovering input 510 and a second hovering input 520 are sensed on a password pad displayed on the screen in a state where a device lock application is running, the device 100 provides information on a next user input for generating input pattern information capable of unlocking the lock. For example, if a third hovering input is required as a next operation, the device outputs guide information 530 for requesting for the third hovering input on one side of the screen.

Figure 6:
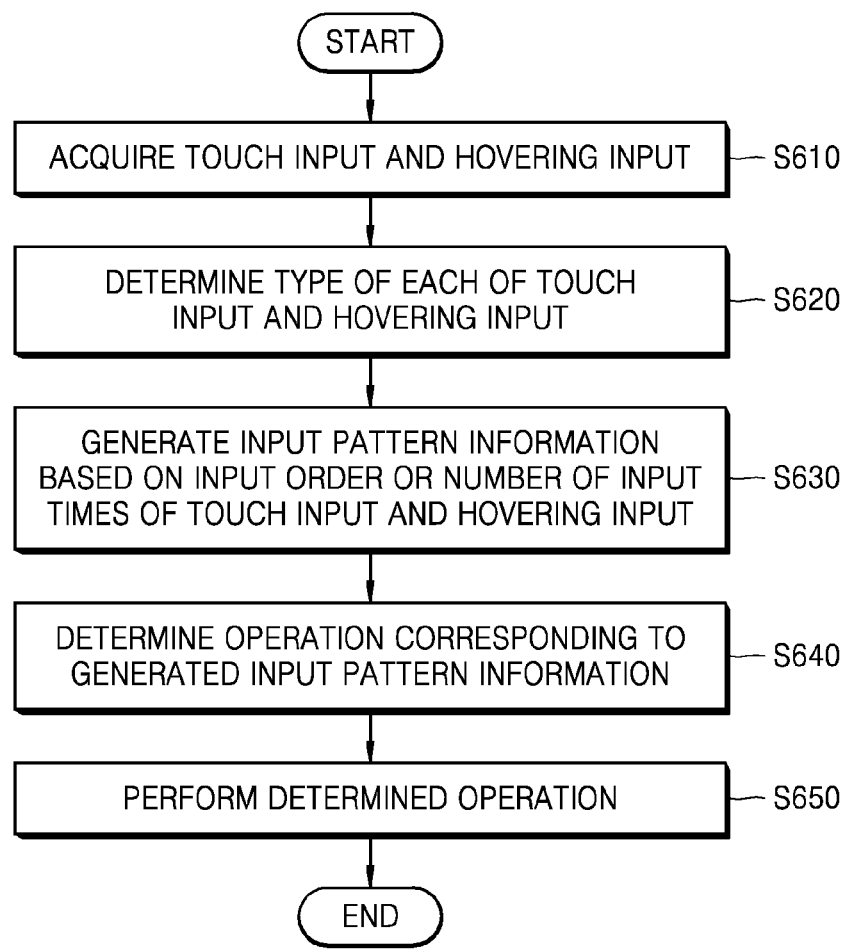
FIG. 6 is a flowchart of a method used by a device to generate input pattern information, according to an embodiment of the present invention.

FIG. 6 is a flowchart of a method used by a device to generate input pattern information, according to an embodiment of the present invention.

In step S610, the device 100 receives the touch input 10 and the hovering input 20. The device 100 may receive the touch input 10 and the hovering input 20 through a preset user interface.

Step S610 corresponds to step S210 described with reference to FIG. 2.

In step S620, the device 100 determines a type of each of the received touch input 10 and the received hovering input 20. The device 100 may identify a type of a received user input based on characteristics of the received user input.

For example, when the touch input 10 is received, the device 100 identifies a type of the received touch input 10 based on characteristics including a location, a time, and a motion of the received touch input 10, a type of a touch input means, etc.

As another example, when the hovering input 20 is received, the device 100 identifies a type of the received hovering input 20 based on characteristics including a location, a time, a gradient, a motion, and a speed of the received hovering input 20, a type of a hovering input means, and the like.

In step S630, the device 100 generates input pattern information based on an input order of the determined touch input 10 and the determined hovering input 20 or number of times the determined touch input 10 and the determined hovering input 20 are input.

For example, when the touch input 10 and the hovering input 20 are simultaneously received, the device 100 may generate first input pattern information.

As another example, when the touch input 10 is first received and then the hovering input 20 is received, the device 100 may generate second input pattern information.

As another example, when the hovering input 20 is first received and then the touch input 10 is received, the device 100 may generate third input pattern information.

The device 100 may identify that the first input pattern information, the second input pattern information, and the third input pattern information differ from each other.

In addition, when the touch input 10 and a plurality of hovering inputs 20 are received, the device 100 may generate fourth input pattern information.

As another example, when a plurality of touch inputs 10 and a plurality of hovering inputs 20 are received, the device 100 may generate different input pattern information according to an acquisition order of the plurality of touch inputs 10 and the plurality of hovering inputs 20.

In step S640, the device 100 determines an operation corresponding to the generated input pattern information, from among operations of a running application. The device 100 receives metadata related to a running application at a time point when the touch input 10 and the hovering input 20 are received. The metadata related to the application includes input pattern information corresponding to each of various operations which may be performed when the application is running. The device 100 determines an operation corresponding to generated input pattern information by comparing the generated input pattern information with the metadata related to the application.

In step S650, the device 100 performs the determined operation.

Step S650 corresponds to step S230 described above with reference to FIG. 2.

Figure 8:
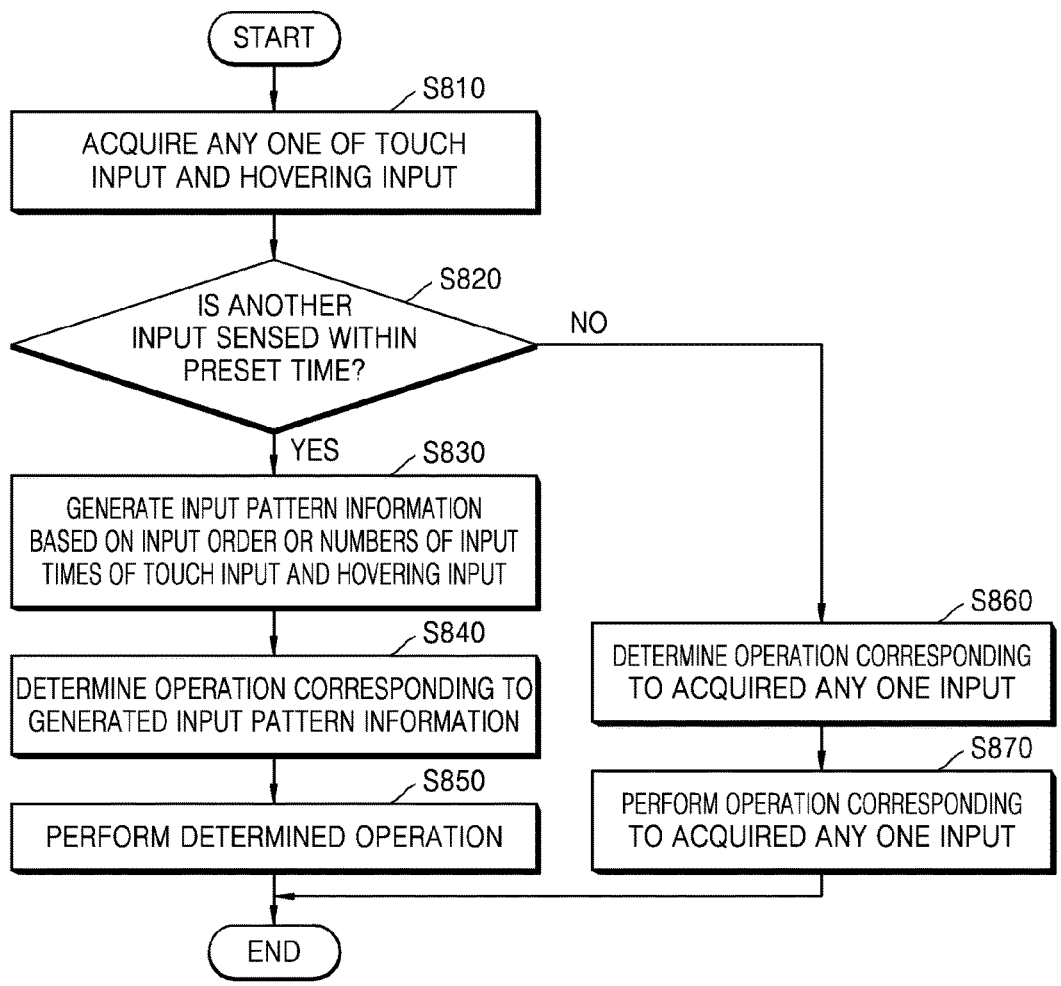
FIG. 8 is a flowchart of a method used by a device to generate input pattern information by determining the validity of a received user input, according to an embodiment of the present invention.

FIG. 8 is a flowchart of a method used by a device to generate input pattern information by determining the validity of a received user input, according to an embodiment of the present invention.

Referring to FIG. 8, in step S810, the device 100 receives any one of the touch input 10 and the hovering input 20. The device 100 determines a type of the received touch input 10 or hovering input 20 by analyzing characteristics of the received touch input 10 or hovering input 20.

For example, the device 100 identifies a type of the touch input 10 based on characteristics including a location, a time, and a motion of the touch input 10, a type of a touch input means, etc.

As another example, when the hovering input 20 is received, the device 100 identifies a type of the hovering input 20 based on characteristics including a location, a time, a gradient, a motion, and a speed of the hovering input 20, a type of a hovering input means, etc.

In addition, the device 100 may store information on a time that any one input is received.

In step S820, the device 100 determines whether another input is sensed within a preset time.

If a second user input is received within a valid time range after a first user input is received, then in step S830, the device 100 generates input pattern information based on the numbers of inputs or an input order of the received touch input 10 and the received hovering input 20. The valid time range may vary according to a type of running application and settings of the device 100.

Step S830 corresponds to step S630 described above with reference to FIG. 6.

In step S840, the device 100 determines an operation corresponding to the generated input pattern information.

Step S840 corresponds to step S640 described above with reference to FIG. 6.

In step S850, the device 100 performs the determined operation.

Step S850 corresponds to step S650 described above with reference to FIG. 6.

If in step S820, a second input is not received within a valid time range after the first user input is received, then in step S860 the device 100 determines an operation corresponding to the first user input, and in step S870 performs an operation corresponding to the first user input.

Figure 9:
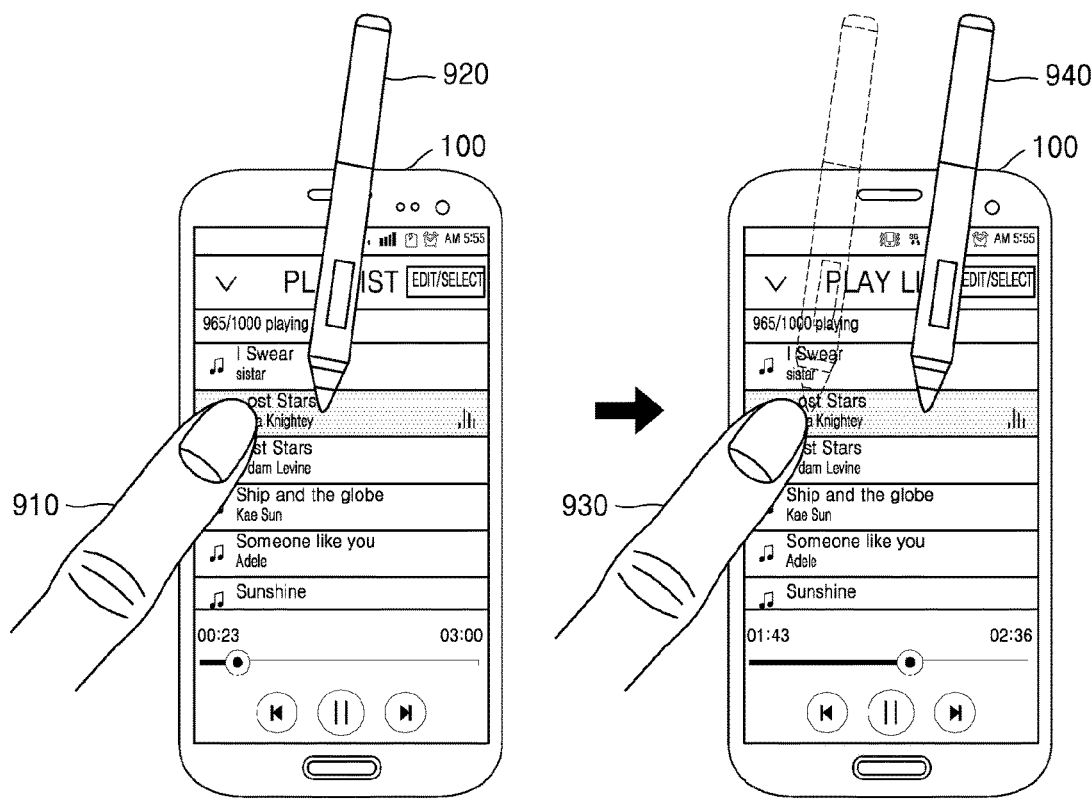
FIG. 9 illustrates a method used by a device to perform an operation based on generated input pattern information, when an application runs on the device, according to an embodiment of the present invention.

FIG. 9 illustrates a method used by a device to perform an operation based on generated input pattern information, when an application runs on the device, according to an embodiment of the present invention.

Referring to FIG. 9, the device 100 executes a music play application. However, this is only illustrative, and the method according to the present embodiment may be applied to various other types of applications.

When the device 100 receives a first touch input 910 and a first hovering input 920 related to the specific song from a music play list the device 100 generates first input pattern information by combining the first touch input 910 and the first hovering input 920. Herein, the first hovering input 920 is vertically input on an item related to the specific song in the music play list.

The device 100 determines an operation corresponding to the generated first input pattern information based on metadata related to the music play application being executed. For example, the device 100 may determine a play operation corresponding to the first input pattern information and play the specific song.

When the device 100 receives both a second touch input 930 and a second hovering input 940 related to the specific song from the music play list, the device 100 generates second input pattern information by combining the second touch input 930 and the second hovering input 940. Herein, the second hovering input 940 is input to have a gradient in a right direction on the item related to the specific song in the music play list.

The device 100 determines an operation corresponding to the generated second input pattern information based on the metadata related to the music play application being executed. For example, the device 100 may determine a fast forward operation corresponding to the second input pattern information and change a section of the specific song being played.

Figure 10:
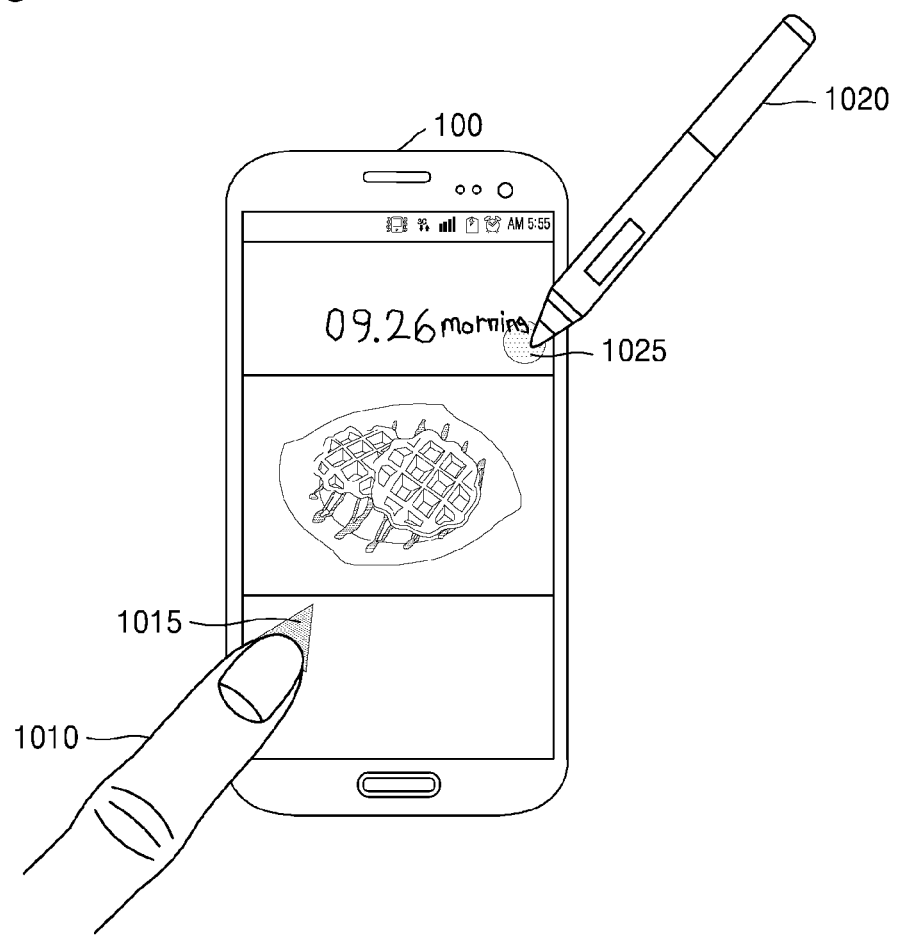
FIG. 10 illustrates a method used by a device to output respective marks for indicating receipt of a touch input and receipt of a hovering input, according to an embodiment of the present invention.

FIG. 10 illustrates a method used by a device to output respective marks for indicating receipt of a touch input and receipt of a hovering input, according to an embodiment of the present invention.

Referring to FIG. 10, when a user input is received, the device 100 provides information on the input to the user by outputting a mark on the screen indicating the acquisition of the user input. In addition, the device 100 may output different marks according to types of received user inputs.

For example, when the first touch input 1010 is received, the device 100 outputs a first valid input mark 1015. That is, when the user inputs the first touch input 1010 into the device 100, the user receives information that the user's input has been validly received by the device 100, through the first valid input mark 1015.

In addition, when the second hovering input 1020 is received, the device 100 outputs a second valid input mark 1025. The second valid input mark 1025 may differ from the first valid input mark 1015. That is, when the user inputs the second hovering input 1020 into the device 100, the user receives information that the user's input has been validly received by the device 100, through the second valid input mark 1025.

Figure 11:
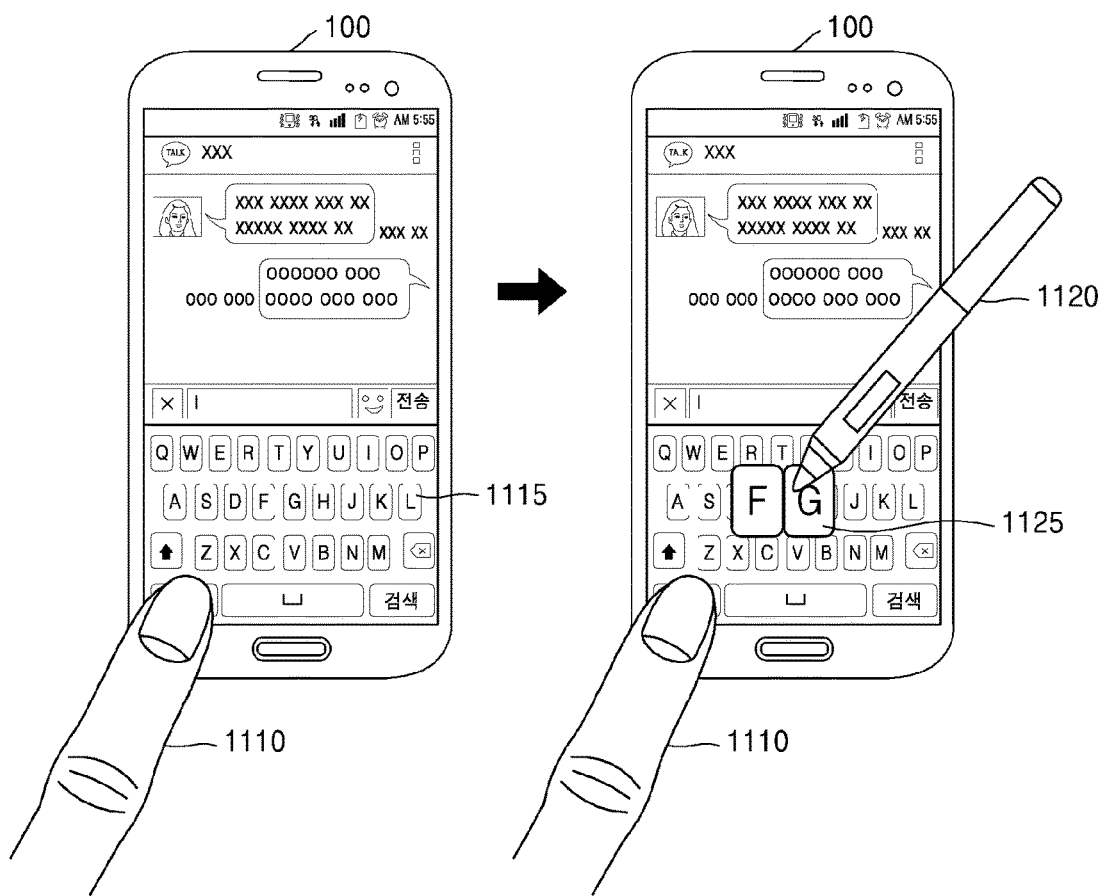
FIG. 11 illustrates a method used by a device to perform an operation based an application running on the device and on input pattern information, which is generated by combining sequentially received user inputs, according to an embodiment of the present invention.

FIG. 11 illustrates a method used by a device to perform an operation based an application running on the device and on input pattern information, which is generated by combining sequentially received user inputs, according to an embodiment of the present invention.

Referring to FIG. 11, a method by which the device 100 performs an operation based on input pattern information generated by combining sequentially received user inputs while a messenger application is running is provided.

As shown in FIG. 11, the device 100 receives a touch input 1110 for requesting to display a keypad, when the messenger application is running. If, while the touch input 1110 is maintained, the device 100 receives a hovering input 1120 within a preset time range from a time point when the touch input 1110 is received, the device generates input pattern information based on the received touch input 1110 and the received hovering input 1120.

The device 100 then determines an operation corresponding to the generated input pattern information based on the messenger application running at a time point when the touch input 1110 and the hovering input 1120 are received. For example, the device may perform an operation of magnifying and displaying a key on the keypad corresponding to a point when the hovering input 1120 is received, based on the generated input pattern information. However, thus is only illustrative, and various operations may be performed by the device 100 according to metadata related to a running application, which is pre-stored in the device 100.

For example, the device 100 may change an arrangement of keys arranged on the keypad when the touch input 1110 and the hovering input 1120 are simultaneously input on the keypad displayed on the screen. This function of the device 100 of changing an arrangement of keys arranged on the keypad may also be applied to a payment application.

As another example, the device 100 may perform an operation of changing a language displayed on the keypad, based on the generated input pattern information.

FIGS. 12A to 12F illustrate a method used by a device to perform an operation based an application running on the device and on input pattern information, which is generated by combining sequentially received user inputs, according to another embodiment of the present invention.

Referring to FIGS. 12A to 12F, a method by which the device 100 performs an operation based on input pattern information generated by combining sequentially received user inputs while a screen lock application is running is provided.

Figure 12A:
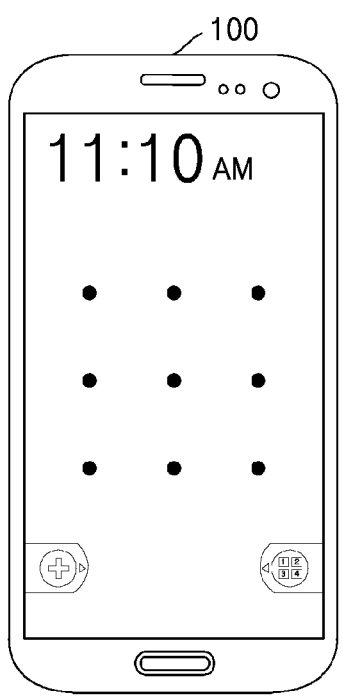
FIGS. 12A to 12F illustrate a method used by a device to perform an operation based an application running on the device and on input pattern information, which is generated by combining sequentially received user inputs, according to another embodiment of the present invention.

In FIG. 12A, when the screen lock application is running, the device 100 provides a user interface capable of inputting a password for unlocking.

Figure 12B:
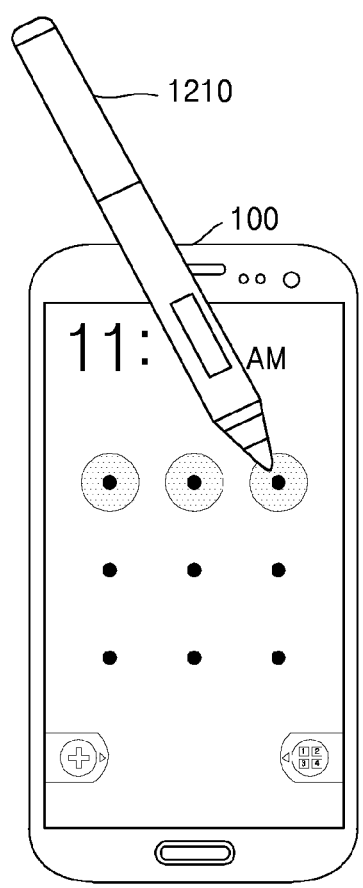

In FIG. 12B, the device 100 receives a first hovering input 1210 moving in the right direction. When the first hovering input 1210 is received, the device 100 stores information on the first hovering input 1210, such as a type of the first hovering input 1210, a time the first hovering input 1210 is received, etc.

Figure 12C:
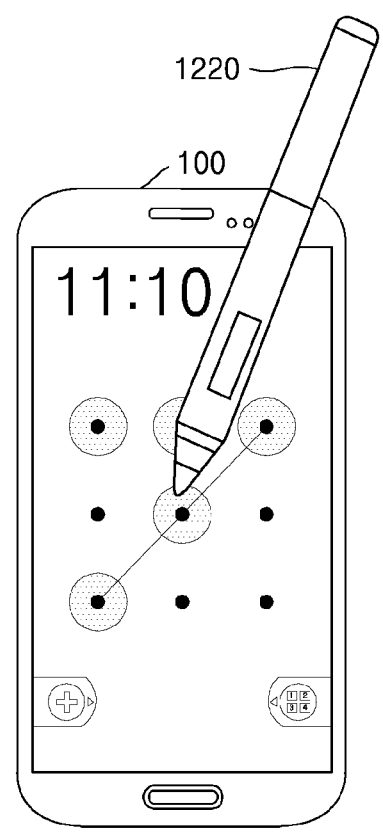

In FIG. 12C, the device 100 receives a second hovering input 1220 moving in a lower left direction. When the second hovering input 1220 is received, the device 100 stores information on the second hovering input 1220, such as a type of the second hovering input 1220, a time the second hovering input 1220 is received, etc.

Figure 12D:
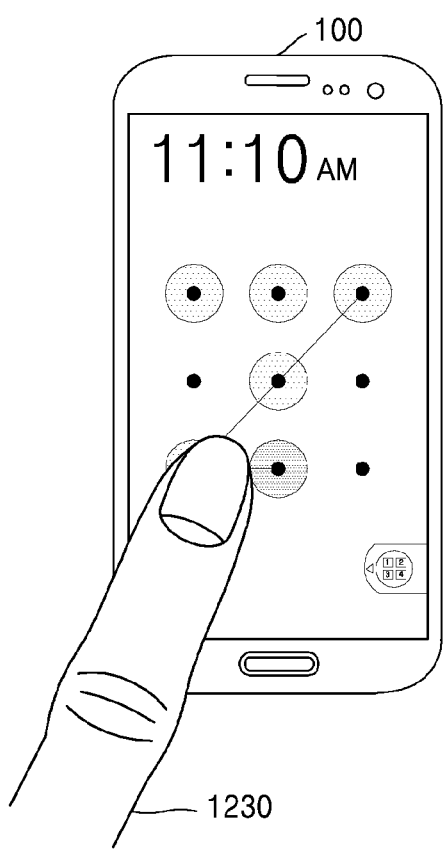

In FIG. 12D, the device 100 receives a first touch input 1230. The device 100 determines whether a time point when the first touch input 1230 is received is within a preset range from a time point when the second hovering input 1220 is received. If the first touch input 1230 is received within a preset range, the device 100 determines the received first touch input 1230 as a valid input for unlocking.

Figure 12E:
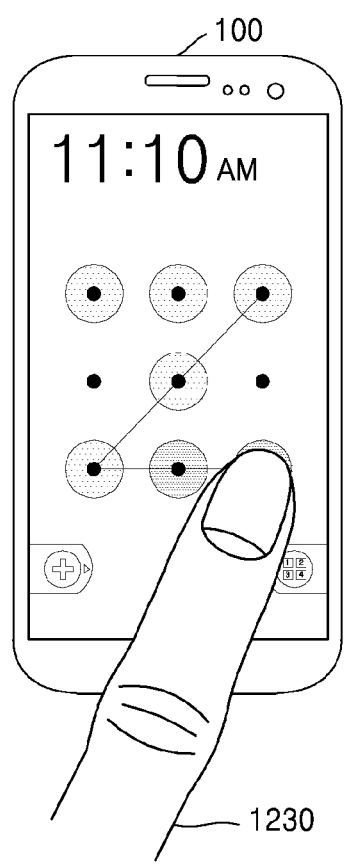

In FIG. 12E, if it is determined that the first touch input 1230 is a valid input, the device 100 stores information on the first touch input 1230, such as a type of the first touch input 1230, a time the first touch input 1230 is received, etc.

Figure 12F:

In FIG. 12F, the device 100 compares input pattern information generated by combining the first hovering input 1210, the second hovering input 1220, and the first touch input 1230 with pattern information preset as a password for unlocking. If the input pattern information matches the preset pattern information, the device 100 unlocks the screen.

Figure 13:
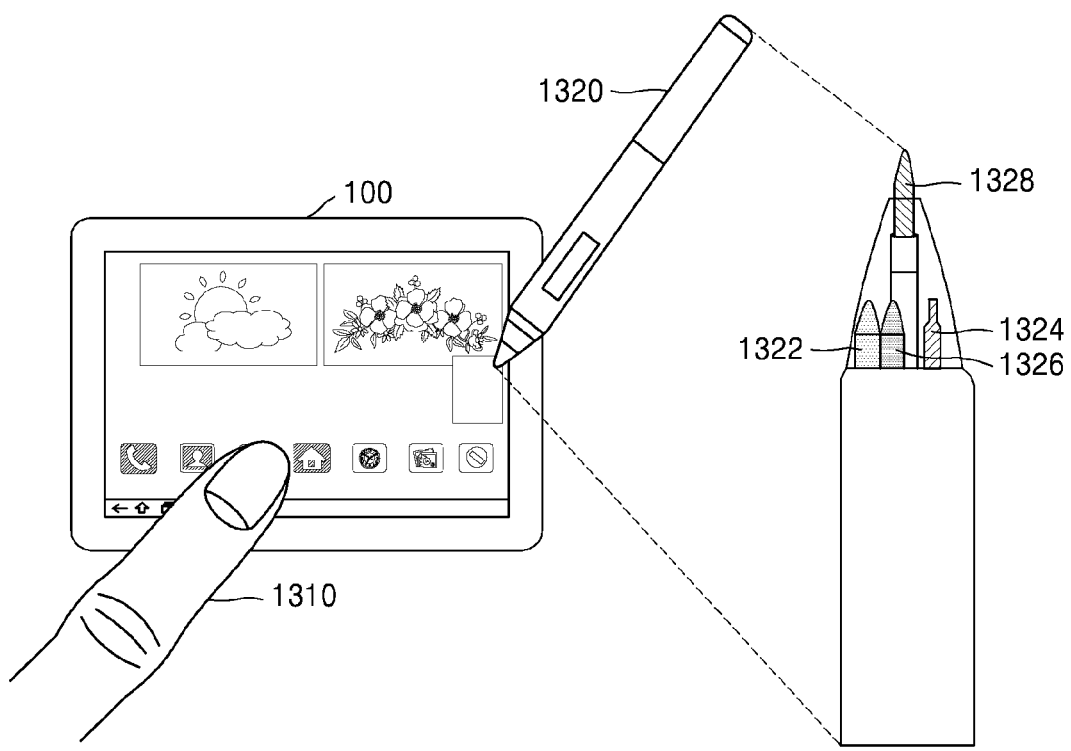
FIG. 13 illustrates a method used by a device to generate different pieces of input pattern information based on a type of hovering input device used, according to an embodiment of the present invention.

FIG. 13 illustrates a method used by a device to generate different pieces of input pattern information based on a type of hovering input device used, according to an embodiment of the present invention.

Referring to FIG. 13, the hovering input means 1320 may include first to fourth input devices 1322, 1324, 1326, and 1328 made of one or more materials. The device 100 may identify a hovering input according to a type of one of the first to fourth input devices 1322, 1324, 1326, and 1328 by using a change in a capacitance detected by the device 100 according to a material constituting each of the first to fourth input devices 1322, 1324, 1326, and 1328.

For example, when a touch input 1310 is received to correspond to a specific application on the device 100 in which a menu application is running, and a hovering input is simultaneously received, the device 100 may execute the specific application at a location where the hovering input is received.

For example, when the touch input 1310 is received to correspond to a message application, and a hovering input is simultaneously received, the device 100 may display a window for a user to input a message, at a location where the hovering input is received.

When the window for the user to input a message is displayed, the device 100 may perform a different operation according to a type of a sensed hovering input. For example, when a first hovering input by the first input device 1322 is received, a keypad for the user to input a text may be displayed. When a second hovering input by the second input device 1324 is received, a list of image files which may be attached to the message may be displayed. When a third hovering input by the third input device 1326 is received, information on contact points to which the message may be transmitted may be displayed. However, these are only illustrative, and an operation corresponding to each hovering input is not limited thereto.

Figure 14:
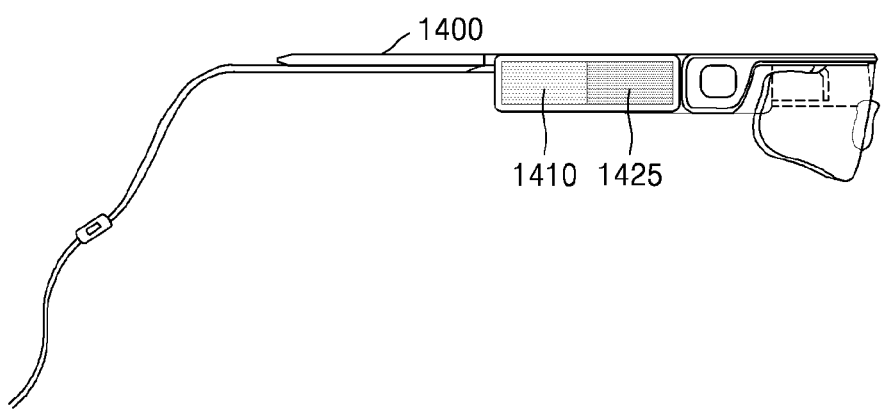
FIGS. 14 and 15 illustrate a first device capable of performing a method of controlling a device, according to an embodiment of the present invention.
Figure 15:
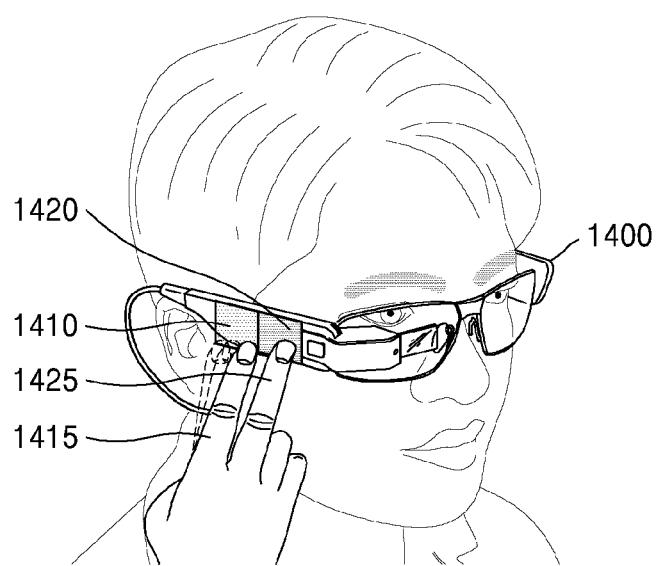

FIGS. 14 and 15 illustrate a first device capable of performing a method of controlling a device, according to an embodiment of the present invention.

Referring to FIGS. 14 and 15, a wearable eyeglass-type device 1400 is provided. Hereinafter, the first device 1400 is referred to as a smart glass 1400.

As shown in FIG. 14, first and second sensing units 1410 and 1420 capable of receiving at least one user input are provided to one side surface of an eyeglass frame surrounding a display unit of the smart glass 1400. The first and second sensing units 1410 and 1420 may be covered with different types of materials according to types of receivable user inputs. For example, the first sensing unit 1410 capable of sensing a hovering input 1415 may be covered with a first material. In addition, the second sensing unit 1420 capable of sensing a touch input 1425 may be covered with a second material. The first and second sensing units 1410 and 1420 of the smart glass 1400 may be covered with different materials so that a user easily identifies the types of the receivable user inputs.

As shown in FIG. 15, the smart glass 1400 may receive a plurality of user inputs through the first and second sensing units 1410 and 1420 to adjust a scale of a map to be displayed on a display unit of the smart glass 1400 when a map application is running.

For example, the smart glass 1400 may adjust the scale of the map to be displayed on the display unit, based on a type of the hovering input 1415 received by the first sensing unit 1410 and a type of the touch input 1425 received by the second sensing unit 1420. The smart glass 1400 may detect that the user has input a request related to an adjustment in the scale of the map, when the touch input 1425 on the second sensing unit 1420 is maintained for a predefined period of time, e.g., two seconds or more.

The smart glass 1400 determines the number of times and a direction of the hovering input 1415 received while the touch input 1425 is maintained. When the hovering input 1415 is input in a first direction, such as a direction oriented to the smart glass 1400, the smart glass 1400 decreases the scale of the map. In addition, the smart glass 1400 determines a decreased degree of the scale of the map according to the number of times the hovering input 1415 is input in the first direction. When the hovering input 1415 is input in a second direction, such as a direction oriented away from the smart glass 1400, the smart glass 1400 increases the scale of the map. In addition, the smart glass 1400 determines an increased degree of the scale of the map according to the number of times the hovering input 1415 is inputted in the second direction.

Figure 16:
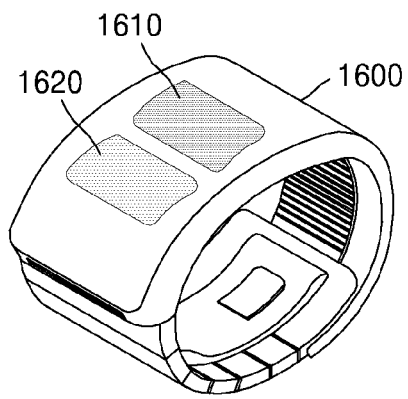
FIGS. 16 to 18 illustrate a second device capable of performing a method of controlling a device, according to an embodiment of the present invention.
Figure 17:
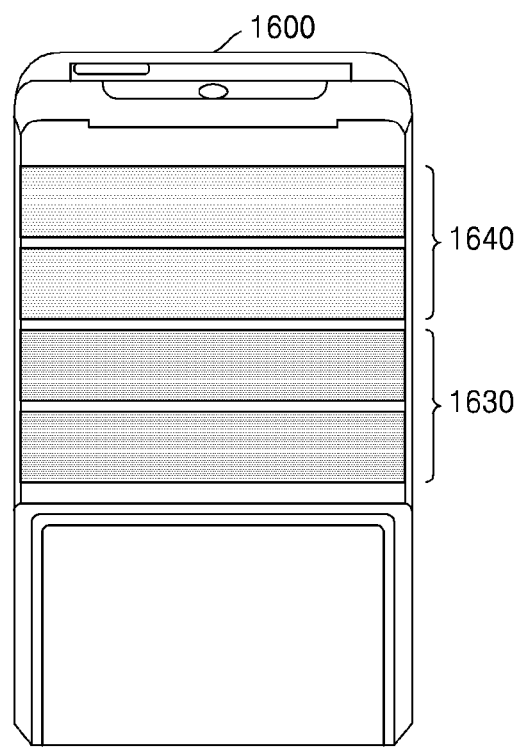
Figure 18:
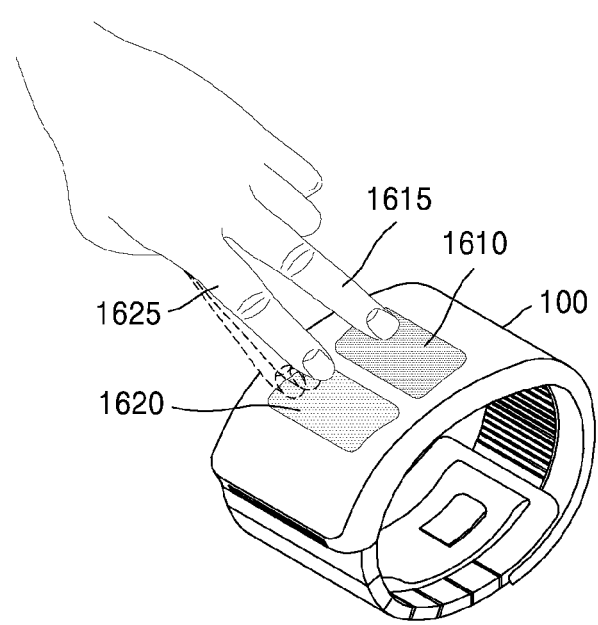

FIGS. 16 to 18 illustrate a second device capable of performing a method of controlling a device, according to an embodiment of the present invention.

Referring to FIGS. 16 to 18, a wearable watch-type device 1600 is provided. Hereinafter, for convenience of description, the second device 1600 is referred to as a smart watch 1600.

The smart watch 1600 includes a display unit capable of displaying an execution result of an application and first to fourth sensing units 1610, 1620, 1630, and 1640 at one side of a watch chain supporting the display unit, as shown in FIGS. 16 and 17. The first to fourth sensing units 1610, 1620, 1630, and 1640 may be covered with different types of materials according to types of receivable user inputs. For example, the first and third sensing units 1610 and 1630 capable of sensing a hovering input 1615 may be covered with a first material. In addition, the second and fourth sensing units 1620 and 1640 capable of sensing a touch input 1625 may be covered with a second material. The first to fourth sensing units 1610, 1620, 1630, and 1640 of the smart watch 1600 may be covered with different materials so that a user easily identifies the types of the receivable user inputs.

When a music play application is running, the smart watch 1600 may receive a plurality of user inputs through the first to fourth sensing units 1610, 1620, 1630, and 1640 to adjust a volume of music being played.

For example, the smart watch 1600 may adjust an output volume of music based on a type of the hovering input 1615 received by the first and third sensing units 1610 and 1630 and a type of the touch input 1625 received by the second and fourth sensing units 1620 and 1640. The smart watch 1600 may detect that the user has input a request related to an adjustment in the volume of the music being played, when the touch input 1625 on the second and fourth sensing units 1620 and 1640 is maintained for a predetermined period of time, e.g., two seconds or more.

The smart watch 1600 determines the number of times and a direction of the hovering input 1615 received in a state where the touch input 1625 is maintained. When the hovering input 1615 is input in a first direction, such as a direction oriented to the smart watch 1600, the smart watch 1600 decreases the volume. In addition, the smart watch 1600 determines a decreased degree of the volume according to the number of times the hovering input 1615 is input in the first direction. When the hovering input 1615 is input in a second direction, such as a direction oriented away from the smart watch 1600, the smart watch 1600 increases the volume. In addition, the smart watch 1600 determines an increased degree of the volume according to the number of times the hovering input 1615 is inputted in the second direction.

Figure 19:
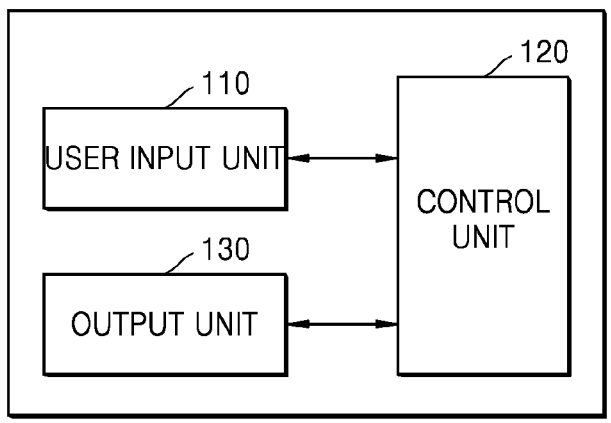

FIGS. 19 and 20 are block diagrams of configurations of a device, according to an embodiment of the present invention.

Referring to FIG. 19, the device 100 includes a user input unit 110, a control unit 120, and an output unit 130. However, not all of the shown components are mandatory. The device 100 may be implemented by more or less components than the shown components.

Referring to FIG. 20, for example, the device 100 may further include a sensing unit 140, a communication unit 150, an audio/video (A/V) input unit 160, and a memory 170 in addition to the user input unit 110, the control unit 120, and the communication output unit 130.

The user input unit 110 is a means through which the user inputs data for controlling the device 100. For example, the user input unit 110 may include a keypad, a dome switch, a touch pad (a capacitive overlay touch pad, a resistive overlay touch pad, an infrared (IR) beam touch pad, a surface acoustic wave touch pad, an integral strain gauge touch pad, a piezoelectric touch pad, etc.), a jog wheel, a jog switch, etc., but is not limited thereto.

The user input unit 110 may receive a plurality of user inputs, including the touch input 10 and the hovering input 20.

The user input unit 110 may receive the touch input 10 and the hovering input 20 simultaneously or sequentially. In addition, the user input unit 110 may receive a plurality of touch inputs 10 and a plurality of hovering inputs 20.

The user input unit 110 provides a user interface including a first area for receiving the touch input 10 and a second area for receiving the hovering input 20. The user input unit 110 receives the touch input 10 and the hovering input 20 through the user interface.

In addition, when any one of the touch input 10 and the hovering input 20 is received, the user input unit 110 provides guide information of a next touch input or a next hovering input, when any one of the next touch input and the next hovering input is received, to perform a preset operation.

The control unit 120 commonly controls a general operation of the device 100. For example, the control unit 120 generally controls the user input unit 110, the output unit 130, the sensing unit 140, the communication unit 150, and the A/V input unit 160 by executing programs stored in the memory 170.

The control unit 120 determines a type of each of a plurality of received user inputs. For example, the control unit 120 determines a type of the received touch input 10 based on a location, a time, and a motion of the received touch input 10, and a type of a touch input means. As another example, the control unit 120 determines a type of the received hovering input 20 based on at least one of a location, a time, a gradient, a motion, and a speed of the received hovering input 20, and a type of a hovering input means. The control unit 120 generates input pattern information by combining the plurality of received user inputs.

When the touch input 10 and the hovering input 20 are received, the control unit 120 generates input pattern information based on an input order of the received touch input 10 and the received hovering input 20 or the number of times the received touch input 10 and the received hovering input 20 are input.

The control unit 120 determines an operation corresponding to the generated input pattern information based on an application running at a time point when the touch input 10 and the hovering input 20 are received. For example, the control unit 120 receives metadata of information on content displayed on a running application, version information of the application, information on user controllable operations in the application, and user input information corresponding to operations performable in the application. In addition, the control unit 120 determines an operation corresponding to the generated input pattern information by using the received metadata.

The output unit 130 performs the operation determined by the control unit 120 and includes a display unit 131, a sound output unit 132, and a vibration motor 133. According to an embodiment of the present invention, the output unit 130 displays a first valid input mark on the screen of the device 100 when the touch input 10 is received and displays a second valid input mark on the screen of the device 100 when the hovering input 20 is received.

The display unit 131 displays information processed by the device 100. For example, the display unit 131 outputs a result of an operation performed according to input pattern information generated by the device 100.

When the display unit 131 and a touch pad form a layer structure to configure a touch screen, the display unit 131 may be used as not only an output device but also an input device. The display unit 131 may include at least one of a liquid crystal display (LCD), a thin-film transistor LCD, an organic light-emitting diode (OLED), a flexible display, a three-dimensional (3D) display, and an electrophoretic display. The device 100 may include two or more display units 131. The two or more display units 131 may be disposed to face each other by using a hinge.

The sound output unit 132 outputs audio data received through the communication unit 150 or stored in the memory 170. In addition, the sound output unit 132 may output an acoustic signal related to a function (e.g., a call signal reception sound, a message reception sound, or an alarm sound) performed by the device 100. The sound output unit 132 may include a speaker, a buzzer, etc.

The vibration motor 133 outputs a vibration signal. For example, the vibration motor 133 outputs a vibration signal corresponding to an output of audio data or video data (e.g., a call signal reception sound, a message reception sound, or the like). In addition, the vibration motor 133 may output a vibration signal when a touch is inputted through the touch screen.

The sensing unit 140 senses a state of the device 100 or a state of the surroundings of the device 100 and transmits the sensed information to the control unit 120.

The sensing unit 140 may include at least one of a magnetic sensor 141, an acceleration sensor 142, a temperature/humidity sensor 143, an IR sensor 144, a gyroscope sensor 145, a position sensor (e.g., global positioning system (GPS)) 146, an atmospheric pressure sensor 147, a proximity sensor 148, and a red, green, and blue (RGB) sensor (illuminance sensor) 149, but is not limited thereto. The function of each of the sensors 141 to 149 may be intuitively inferred by those of ordinary skill in the art from the names thereof, and thus a detailed description thereof is omitted.

The communication unit 150 includes one or more components enabling the device 100 to communicate with an external device or a server. For example, the communication unit 150 includes a short-range wireless communication unit 151, a mobile communication unit 152, and a broadcast reception unit 153.

The short-range wireless communication unit 151 may include a Bluetooth communication unit, a Bluetooth low energy (BLE) communication unit, a near-field wireless communication unit, a wireless local area network (WLAN) (Wi-Fi) communication unit, a Zigbee communication unit, an infrared data association (IrDA) communication unit, Wi-Fi Direct (WFD) communication unit, an ultra-wideband (UWB) communication unit, an Ant+ communication unit, etc., but is not limited thereto.

The mobile communication unit 152 transmits and receives a wireless signal to and from at least one of a base station, an external terminal, and a server in a mobile communication network. Herein the wireless signal may include a voice call signal, a video call signal, or various types of data according to text/multimedia message transmission and reception.

The broadcast reception unit 153 receives an external broadcast signal and/or broadcast related information through a broadcast channel, and the broadcast channel may include a satellite channel and a terrestrial channel. According to an embodiment of the present invention, the device 100 may not include the broadcast reception unit 153.

The communication unit 150 may share, with the external device, a performed result of an operation corresponding to generated input pattern information. In this case, the communication unit 150 transmits the performed result of the operation corresponding to the input pattern information to the external device through a server or may do so directly.

The communication unit 150 may receive a performed result of an operation corresponding to generated input pattern information from an external device. In this case, the communication unit 150 receives the performed result of the operation corresponding to the input pattern information from the external device through a server or may receive the result directly.

The communication unit 150 may receive a call connection request from the external device.

The A/V input unit 160 is for inputting an audio signal or a video signal and includes a camera 161, and a microphone 162. The camera 161 may receive an image frame of a still image, a moving picture, etc. through an image sensor in a video call mode or a capturing mode. An image captured through the image sensor may be processed by the control unit 120 or a separate image processing unit.

The image frame processed by the camera 161 may be stored in the memory 170 or transmitted externally through the communication unit 150. Two or more cameras 161 may be provided depending on an implementation form of the device 100.

The microphone 162 receives an external acoustic signal and converts the external acoustic signal to electrical voice data. For example, the microphone 162 may receive an acoustic signal from an external device or a speaker. The microphone 162 may use various noise cancellation algorithms to cancel noise generated during a process of receiving an external acoustic signal.

The memory 170 stores programs for processing and control of the control unit 120 and stores inputted/outputted data (e.g., a plurality of menus, a plurality of first-layer sub-menus corresponding to each of the plurality of menus, a plurality of second-layer sub-menus corresponding to each of the plurality of first-layer sub-menus, etc.).

The memory 170 may include at least one type of storage medium among a flash memory type memory, a hard disk type memory, a multimedia card micro type memory, a card type memory (e.g., a secure digital (SD) or extreme digital (XD) memory, etc.), random access memory (RAM), static RAM (SRAM), read only memory (ROM), electrically erasable programmable ROM (EEPROM), PROM, a magnetic memory, a magnetic disc, and an optical disc. In addition, the device 100 may operate a web storage or a cloud server which performs a storage function of the memory 170 over the Internet.

The programs stored in the memory 170 may be classified into a plurality of modules according to functions thereof, e.g., a user interface (UI) module 171, a touch screen module 172, an alarm module 173, etc.

The UI module 171 may provide a specified UI, a graphic user interface (GUI), or the like interoperating with the device 100 for each application.

The touch screen module 172 senses a touch gesture of the user on the touch screen and transmits information regarding the touch gesture to the control unit 120. The touch screen module 172 recognizes and analyzes a touch gesture. The touch screen module 172 may be configured by separate hardware including a controller.

Various sensors for sensing a touch or a proximity touch on the touch screen may be provided inside or nearby the touch screen.

An example of a sensor for sensing a touch on the touch screen is a tactile sensor. The tactile sensor is a sensor for sensing a contact of a specific object at a degree of human feeling or more. The tactile sensor senses various pieces of information, such as roughness of a contact surface, hardness of a contact object, a temperature of a contact point, etc.

Another example of a sensor for sensing a touch on the touch screen is a proximity sensor.

The proximity sensor is a sensor for detecting whether an object approaching a predetermined detection surface or a nearby object exists by using an electromagnetic force or an IR ray without a mechanical contact. Examples of the proximity sensor are a transmissive optoelectric sensor, a direct reflective optoelectric sensor, a mirror reflective optoelectric sensor, a high-frequency oscillation proximity sensor, a capacitive proximity sensor, a magnetic proximity sensor, an IR proximity sensor, etc.

Examples of a touch gesture of the user are a tap, a touch and hold, a double tap, a drag, a panning, a flick, a drag and drop, a swipe, etc.

The alarm module 173 generates a signal for notifying of the occurrence of an event of the device 100. Examples of an event generated by the device 100 are call signal reception, message reception, a key signal input, a schedule notification, the acquisition of a user input, etc. The alarm module 173 may output an alarm signal in a video signal form through the display unit 131, in an audio signal form through the acoustic output unit 132, or in a vibration signal form through the vibration motor 133.

The methods according to the embodiments of the present invention may be implemented in a program instruction form executable through various computer means and recorded in a non-transitory computer-readable recording medium. The computer-readable recording medium may include program instructions, data files, data structures, and the like, taken alone or in combination. The program instructions recorded in the medium may be particularly designed and configured for the one or more embodiments or well-known and usable to those of ordinary skill in the computer software field. Examples of the computer-readable recording medium are magnetic media such as hard disks, floppy disks, and magnetic tapes, optical media such as CD-ROMs and digital versatile discs (DVDs), magneto-optical media, such as floptical disks, and hardware devices, such as read-only memory (ROM), random-access memory (RAM), flash memories, etc., particularly configured to store and execute program instructions. The program instructions include, for example, not only machine language codes made by a compiler, but also high-language codes executable by a computer by using an interpreter or the like.

It should be understood that embodiments described herein should be considered in a descriptive sense only and not for purposes of limitation. Descriptions of features or aspects within each embodiment of the present invention should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims and their equivalents.

What is claimed is:

1. A method of controlling a device, the method comprising:
    receiving, by the device, a touch input on a first sensing area of the device and a hovering input on a second sensing area of the device, the second sensing area being separate from the first sensing area of the device;
    determining input pattern information according to the received touch input and the received hovering input when the touch input and the hovering input are received within a preset time range; and
    performing an operation corresponding to the input pattern information from among operations of an application running on the device,
    wherein the first sensing area comprises first block units only for identifying the touch input and the second sensing area comprises second block units only for identifying the hovering input,
    wherein the device differently sets the first block units from the second block units, based on a first range of the touch input obtained through a first user interface included in at least part of the first block units, and a second range of the hovering input obtained through a second user interface included in at least part of the second block units, and
    wherein the first user interface and the second user interface are differently displayed based on the touch input and the hovering input being received simultaneously.

2. The method of claim 1, wherein the input pattern information is generated based on at least one of a determination of the received touch input and the received hovering input, an input order of the received touch input and the received hovering input, and respective number of times the received touch input and the received hovering input are input,
    wherein the received touch input is determined based on at least one of a location and a time of the touch input, and a means and a motion of a device for generating the touch input, and
    wherein the received hovering input is determined based on at least one of a location and a time of the hovering input, and a means and a motion of a device for generating the hovering input.

3. The method of claim 1, wherein the first sensing area for identifying the received touch input is set to be larger than the second sensing area for identifying the received hovering input.

4. The method of claim 1, further comprising providing a user interface including a first area for receiving the touch input and a second area for receiving the hovering input,
    wherein the touch input and the hovering input are received through the user interface.

5. The method of claim 1, further comprising providing guide information of a next touch input or a next hovering input, when any one of the next touch input and the next hovering input is received, to perform a preset operation.

6. The method of claim 1, wherein determining the input pattern information comprises generating the input pattern information by combining the received touch input and the received hovering input, when a difference between a time when the touch input is received and a time when the hovering input is received is less than a critical value.

7. The method of claim 1, further comprising displaying a first valid input mark on a screen of the device when the touch input is received and displaying a second valid input mark on the screen of the device when the hovering input is received.

8. The method of claim 1, wherein performing the operation comprises:
    detecting an operation corresponding to the input pattern information from a database in which information on an operation of the device corresponding to a received input is pre-stored, when the application is executed in the device.

9. A device comprising:
a user input unit configured to receive a touch input on a first sensing area of the device and a hovering input on a second sensing area of the device, the second sensing area being separate from the first sensing area of the device;
a control unit configured to determine input pattern information according to the received touch input and the received hovering input when the touch input and the hovering input are received within a preset time range and perform an operation corresponding to the input pattern information, from among operations of an application being executed in the device,
wherein the first sensing area comprises first block units only for identifying the touch input and the second sensing area comprises second block units only for identifying the hovering input,
wherein the device differently sets the first block units from the second block units, based on a first range of the touch input obtained through a first user interface included in at least part of the first block units, and a second range of the hovering input obtained through a second user interface included in at least part of the second block units, and
wherein the first user interface and the second user interface are differently displayed based on the touch input and the hovering input being received simultaneously.

10. The device of claim 9, wherein the input pattern information is generated based on at least one of a determination of received touch input and the received hovering input, an input order of the received touch input and the received hovering input, and respective number of times the received touch input and the received hovering input are input,
wherein the received touch input is determined based on at least one of a location and a time of the touch input, and a means and a motion of a device for generating the touch input, and
wherein the received hovering input is determined based on at least one of a location and a time of the hovering input, and a means and a motion of a device for generating the hovering input.

11. The device of claim 9, wherein the first sensing area for identifying the received touch input is set to be larger than the second sensing area for identifying the received hovering input.

12. The device of claim 9, wherein the user input unit is further configured to provide a user interface including a first area for receiving the touch input and a second area for receiving the hovering input and to receive the touch input and the hovering input through the user interface.

13. The device of claim 9, wherein the user input unit is further configured to provide, when any one of a next touch input and a next hovering input is received, guide information about the next touch input or the next hovering input to perform a preset operation.

14. The device of claim 9, wherein the control unit is further configured to generate the input pattern information by combining the received touch input and the received hovering input, when a difference between a time when the touch input is received and a time when the hovering input is received is less than a critical value.

15. The device of claim 9, further comprising an output unit configured to display a first valid input mark on a screen of the device when the touch input is received and to display a second valid input mark on the screen of the device when the hovering input is received.

16. The device of claim 9, wherein the control unit is further configured to identify an input pattern generated based on a combination of the received touch input and the received hovering input and detect an operation corresponding to the identified pattern from a database in which information on an operation of the device corresponding to a received input is pre-stored, when the application is executed in the device.

17. A non-transitory computer-readable medium having recorded thereon a computer-readable program for performing the steps of:
receiving, by the device, a touch input on a first sensing area of the device and a hovering input on a second sensing area of the device, the second sensing area being separate from and different than the first sensing area of the device;
determining input pattern information according to the received touch input and the received hovering input when the touch input and the hovering input are received within a preset time range; and
performing an operation corresponding to the input pattern information from among operations of an application running on the device,
wherein the first sensing area is only for identifying the touch input and the second sensing area is only for identifying the hovering input, and
wherein the device differently sets block units for identifying the touch input from block units for identifying the hovering input, based on a first range defined by a first block unit of a touch input selecting a first function, and a second range defined by a second block input of a hovering input selecting a second function.

* * * * *